Oct. 23, 1923.

R. W. GAGE

CYLINDER REBORING MACHINE

Filed April 2, 1921

INVENTOR.
RAYMOND W. GAGE
BY
Ralzemond A. Parker
ATTORNEY.

Oct. 23, 1923.　　　　　　　　　　　　　　　　　　　　1,471,458
R. W. GAGE
CYLINDER REBORING MACHINE
Filed April 2, 1921　　　　3 Sheets-Sheet 2

INVENTOR.
RAYMOND W. GAGE
BY
Ralzymond A. Parker
ATTORNEY.

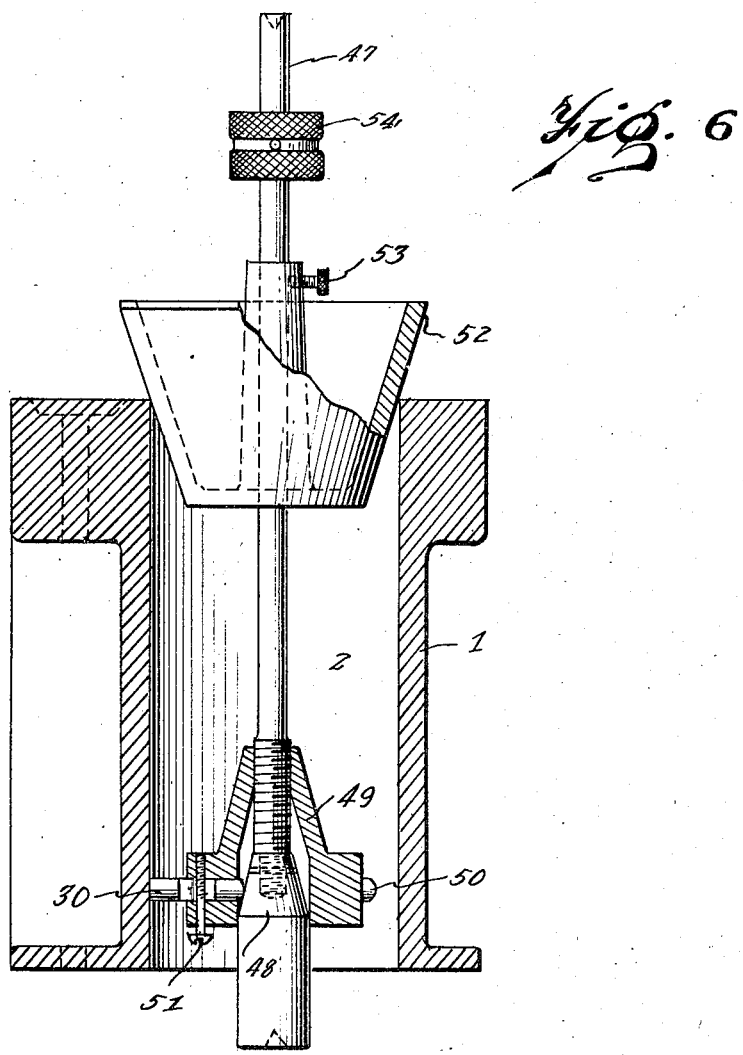

Patented Oct. 23, 1923.

1,471,458

UNITED STATES PATENT OFFICE.

RAYMOND W. GAGE, OF JACKSON, MICHIGAN.

CYLINDER-REBORING MACHINE.

Application filed April 2, 1921. Serial No. 457,974.

*To all whom it may concern:*

Be it known that I, RAYMOND W. GAGE, a citizen of the United States, residing at Jackson, county of Jackson, State of Michigan, have invented a certain new and useful Improvement in Cylinder-Reboring Machines, and declare the following to be a full, clear, and exact description of the same, such as will enable others skilled in the art to which it pertains to make and use the same, reference being had to the accompanying drawings, which form a part of this specification.

My invention relates to cylinder re-boring machines. The object is to provide a simple, inexpensive device of light construction adapted to be easily driven by hand, or, if desired, by power, which is adapted to bore to an accurate diameter concentric the axis of the cylinder.

A further object is to provide a re-boring device in which the cutter head is advanced along a spindle which has been accurately and positively centered relative the bore of the cylinder so as to ream to a uniform radius concentric the axis of the bore.

A further object is to provide a re-boring device comprising a minimum of parts and of simple construction capable of being quickly dismantled and the boring bar and cutter head of which can be removed thru the bottom of the cylinder bore by removing the lower base plate of the re-boring tool.

A further object of my invention is the provision of a reboring tool of such a character that it can be easily driven by hand from the beginning to the completion of the reaming operation at a continuous steady rate of advance, thereby leaving no rough spots in the bore of the cylinder as frequently results where the boring operation is interrupted.

These and other objects of the invention, together with details of construction will more fully appear from the following description, appended claims, and accompanying drawings, in which:

Fig. 6 is a vertical sectional view thru a cylinder, showing my improved centering mechanism which is adapted to be used to center the boring tool in position.

Figure 1:
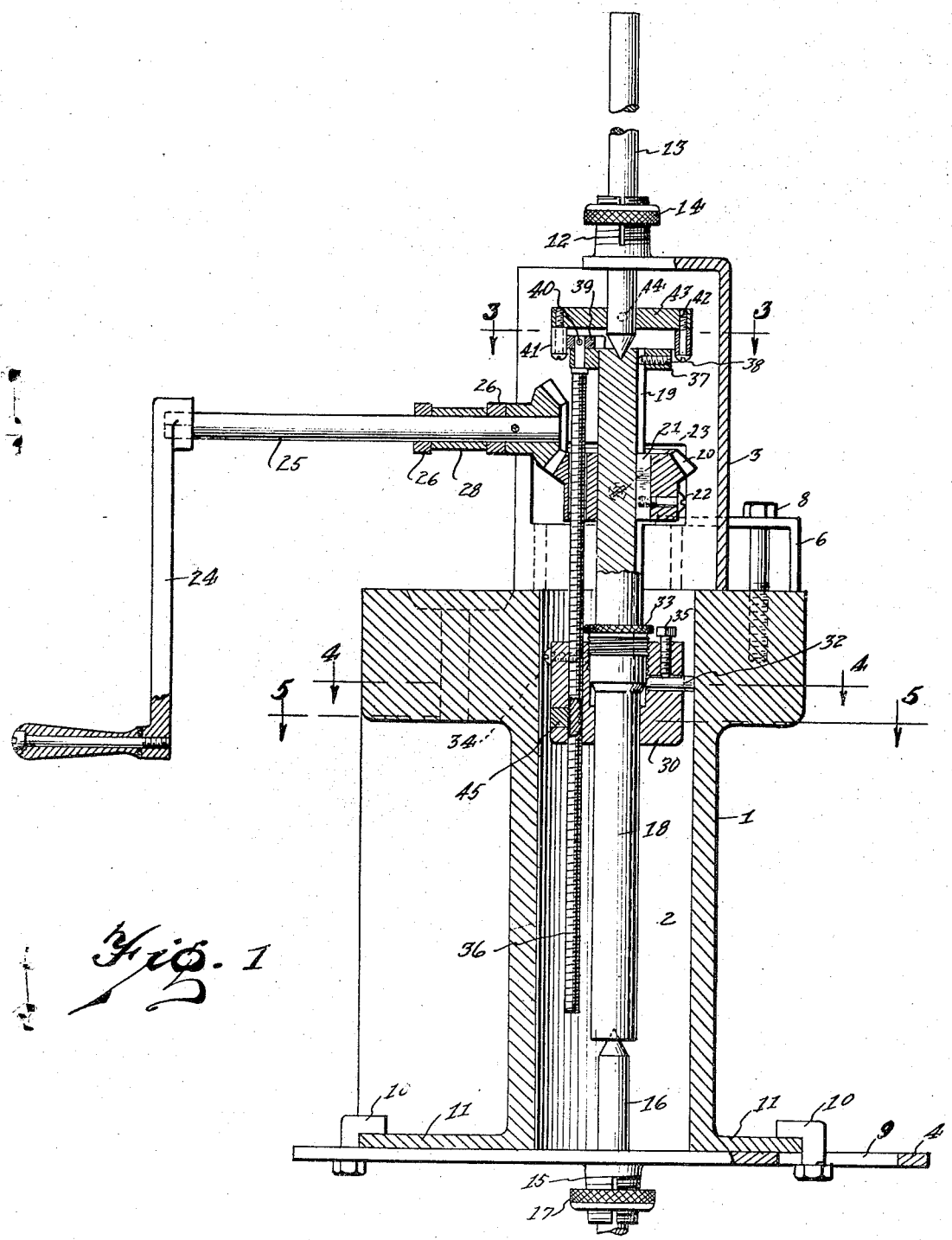
Figure 1 is a horizontal sectional view showing my reboring tool secured to a cylinder.
Figure 2:
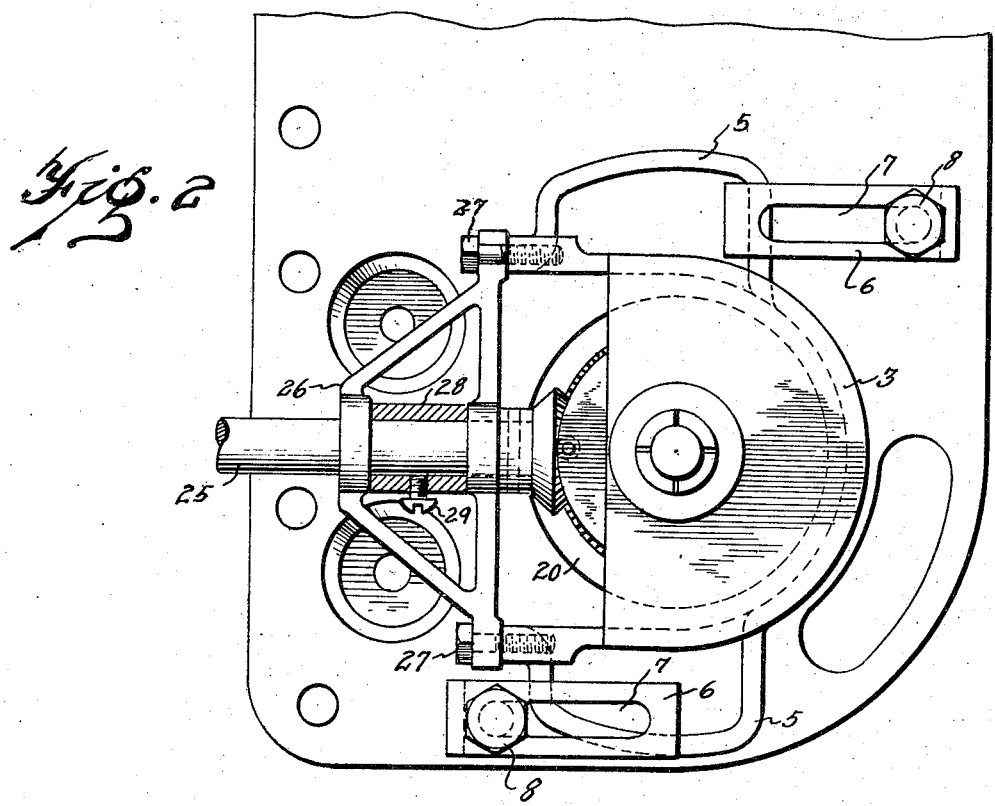
Fig. 2 is a plan view.
Figure 4:
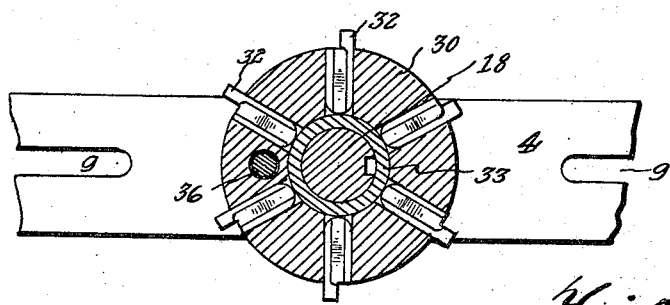
Fig. 4 is a view taken on line 4—4 of Fig. 1.
Figure 3:
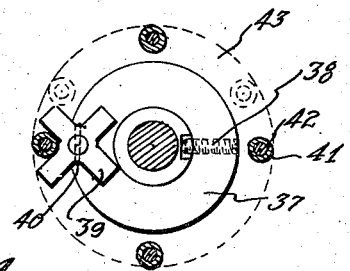
Fig. 3 is a view taken on line 3—3 of Fig. 1.

In the drawings, let 1 indicate a cylinder casting, 2 being the bore thereof. My device comprises a housing 3 adapted to be secured to the top of the cylinder block and a base plate 4 adapted to be secured to the bottom of the cylinder. The housing 3 is provided with projecting ears 5 which are adapted to be engaged by the slotted clamping pieces 6. These clamps 6 are slotted as at 7 to be received over the bolts 8 which secure the cylinder head in place and which are threaded into the wall of the cylinder block, as shown in Figs. 1 and 2. These bolts are standard on cylinders. The clamps are adjustable for cylinder blocks of varying size. It is apparent that though two clamps only are shown that they might be supplied in sufficient number or of such a character as to securely hold the housing in position on top of the cylinder block. Base plate 4 is provided with slots 9 thru which extend an L-shaped cleat 10 adapted to grip the lower flange 11 of the cylinder block so as to secure the base plate thereto. As shown in the drawing, these cleats are adjustable and the slots in the base plate provide for permitted movement of the cleat to adjust for flanges of varying widths.

The top of the housing 3 is cut away as shown in Figs. 1 and 2 and the housing is open on one side, so as to make the interior thereof easily accessible. Extending upwardly from the top of the housing is an externally threaded tapered split boss 12 thru which is adapted to extend a center 13. A knurled tightening nut 14 is threaded on the boss adapted to secure the center therein at any adjusted position. A similar threaded boss 15 is provided on the base plate adapted to receive the center 16 which is similarly provided with a tightening nut 17. I provide a boring bar or spindle 18 adapted to be mounted between the said centers for rotation, as shown in Fig. 1. This boring bar is provided with a longitudinal keyway 19 extending the length thereof.

A bevel gear 20 is secured to the boring bar by means of a key 21 which fits in the above mentioned key way and is held in place therein by means of a screw 22, as shown in Fig. 1, so that said bar and gear will rotate as one piece. The bevel gear is secured in its adjusted position on the bar by set screw 23.

To drive the spindle, I provide a hand crank 24, by means of which a shaft 25 is rotated, which shaft is journaled in bearings provided in a bracket member 26, secured to the housing 3, as shown in Fig. 2, by means of bolts 27. A thrust collar 28 is secured to the shaft 25 by means of a set screw 29, which collar is adapted to take up the thrust so as to relieve the gears thereof. It is apparent that a pulley might be mounted on the shaft 25 to provide for power drive, if desired.

A cutter head 30 surrounds the boring bar and is coupled therewith by means of a key 21 which fits in the key way 19 of the bar, so that said cutter head will rotate with the bar, but is permitted a feeding movement along the bar during such rotation. This cutter head is provided with a series of cutter knives 32 disposed in radial slots in the head and adapted to be expanded radially outwardly by means of an adjustment nut 33 which is threaded into the cutter head, the bevel portion of which nut provides for varying expansion adjustments of the cutter knives. To facilitate adjustment by hand, this nut is provided with a knurled peripheral portion adapted to be grasped by the operator. It is apparent that the cutter knives may be expanded to any adjustment provided for by the conical face of the adjustment nut which engages the ends of the knives. This expansion of the cutter knives can be measured with a micrometer and the knives expanded to a desired radius. It is likewise apparent that expansion of all the knives will be simultaneous and equal. A set screw 34 is provided extending through the cutter head to secure the adjusting nut in any adjusted position. Set screws 35 are provided, one for each cutter knife, threaded downwardly into the cutter head, adapted to engage the upper flattened face of the knife to hold the same in position. It is apparent however, that the knives, when adjusted to a desired radius, will be prevented from contracting by virtue of the adjustment nut which will hold them outwardly and the set screws will not be depended upon for this function.

In the drawings, I show a cutter head provided with six knives. However, cutter knives in such numbers as desired may be provided; also in practice it would be desirable to provide for example three sets of cutter knives for a head, thereby providing for a wider range of adjustment as to cutting diameters. Also it would be desirable to provide, for example, two sizes of cutter heads, each provided with a series of knives, thereby securing a maximum range of adjustment. The cutter head is fed through the cylinder bore along the boring bar by means of an independent feed screw 36, which extends parallel the boring bar and is adapted to revolve therewith about the axis of the boring bar as the bar is rotated; but is adapted so as to provide for an independent rotation about its own axis to advance the cutter head. The feed screw is carried by a plate 37 which is secured to the top of the boring bar, as shown in Fig. 1, by means of a set screw 38 which is received in the key way 19 of the bar so that said plate will rotate with the bar and be rigidly fastened thereto.

Within this plate is journaled the feed screw, as shown, a shoulder being provided below the plate. Secured to the upwardly extending end of the feed screw so as to rotate as one piece therewith is a star wheel 39 fastened to the feed screw by means of a pin 40. The points of the star wheel project outwardly so as to be intercepted in the rotation of the boring bar by a series of rollers 41, each of which is mounted on a pin 42 which is carried by a disk 43 secured to the center 13 by means of a set screw 44. These rollers serve as stationary pawls to provide for an intermittent rotation of the star wheel with a consequent independent rotation of the feed screw upon its own axis as the boring bar is rotated.

Figure 5:
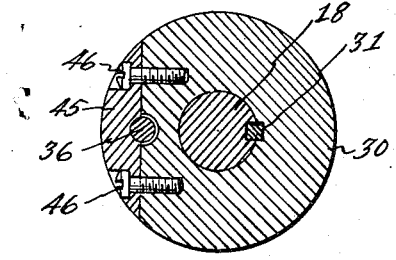
Fig. 5 is a view taken on line 5—5 of Fig. 1.

The feed screw is coupled with the cutter head by means of a threaded feed segment 45 detachably fastened to one side of such cutter head by means of screws 46. The inner face of this feed segment is threaded to engage with the thread of the feed screw to provide for the advance of the cutter head when the segment has been fastened in place on the side of the cutter head so as to engage said feed screw. The inner face of the cutter head adjacent the feed screw is cut away so as to provide clearance between the feed screw and the main body of the cutter head, as shown in Fig. 5, so that when the threaded segment is loosened by giving the retaining screws 46 a half turn, the segment will fall away from the cutter head sufficiently to permit the head to be moved along the feed screw without engaging therewith.

Upon the completion of a boring operation, the cutter head can be elevated again to the starting position moving freely along the feed screw by loosening the screws 46.

To position the center, I provide a centering device, as shown in Fig. 6. This centering device comprises a rod 47 provided with an axial concavity in each end as shown, adapted to receive the point of the centers. In Fig. 5, 1 indicates the cylinder wall, and 2 the bar thereof. Rod 47 is provided at the lower end with an enlarged flaring portion 48, being threaded immediately thereabove to receive an expanded centering element 49 threaded thereon as shown. This centering element carries a series of adjusting centering pins 50 arranged radially the axis of said element, being received in provided passageways held in position therein by means of set screws 51, as shown. Each pin is cut away on one side to provide a half slot within which this set screw fits to hold the pin in place. As the centering element 49 is threaded down on the rod the conical shoulder formed on the rod comes in contact with the ends of the centering pins, expanding them axially outwardly. By this means it is possible to center the rod accurately the lower portion of the cylinder bore. As a cylinder bore usually wears in the middle rather than at the end thereof, the lower end of the bore would normally be a true section of the bore.

I also provide means for centering the rod relative the upper end of the cylinder which comprises a hollow cup-like section 52 in the form of a frustrum of a cone, adapted to be received in the upper portion of the bore, and of such size as not to come entirely within the bore. This cone would serve to center the rod axially the upper end of the bore and a set screw 53 is provided to secure such cone in its adjusted position. A knurled thumb nut 54 is secured to the rod by means of which the rod can be rotated relative the bottom centering element so as to be threaded therein.

In the operation of my device the rod 47 is centered relative the bore of the cylinder by means of the centering mechanism above described. Upper and lower centers 13 and 16 are then centered relative said rod by means of the axial concavities provided in the ends of the rod. When the centering pieces are in position the upper housing and the lower base plate are then secured to the cylinder. It is then possible to remove the centering mechanism from the bore of the cylinder through the opening in the housing 3 by withdrawing one of the centers, which can be accomplished by loosening the tightening nut which secures the center in the boss.

After the centering mechanism has been removed the boring bar and cutter head can be inserted in position between the centers, the withdrawn center lowered to engage the boring bar and tightened in place; the machine will then be ready for use. To permit entrance through the open side of the housing to the interior of the cylinder the bracket 26, in which is journaled the hand crank 25, is detached from the housing by unfastening the bolt 27.

To dismount the machine the base plate can be disengaged from the lower flange on the cylinder block by loosening the clips 10. It will then be possible to withdraw the boring bar and cutter head through the lower end of the cylinder bore.

As shown in Fig. 6, the disk 43 is provided with three auxiliary screw holes spaced equi-distant from each other, adapted to receive threaded screws 42 which carry the rollers that serve as stationary pawls. This provision is made in case it is desired to provide a slower rate of advance for the cutter head, three intercepting pawls being used instead of the four shown in the drawing. It is apparent that these intercepting members can be provided in such number as may be desired to produce the rate of advance thought best suited to the boring operation.

What I claim is:

1. In a cylinder reboring tool, a supporting member provided with a center, which supporting member is adapted to be secured to one end of a cylinder so that the said center is disposed axially the bore of the cylinder, a housing provided with an axially adjustable center, which housing is adapted to be secured at the other end of the cylinder so that the said center is disposed axially the bore of the cylinder, said housing having an opening on one side, a boring bar adapted to be supported between said centers for rotation, said boring bar provided with a cutter head and feed mechanism carried by the bar and adapted to be inserted as a unit through the open side of the housing into the bore of the cylinder when the housing is secured to the cylinder, and releasable driving means carried by the housing adapted to engage the feed mechanism of said bar to rotate the same.

2. In a cylinder reboring tool, a supporting plate carrying a center, which plate is adapted to be releasably secured to one end of a cylinder so that the center is disposed axially the bore of the cylinder, a housing carrying a center, which housing is adapted to be releasably secured to the opposite end of the cylinder so that the center is disposed axially the bore of the cylinder, said center being axially adjustable within the housing, said housing provided with an opening on one side, a boring bar adapted to be rotatably supported between said centers, a cutter head carried by said bar to rotate therewith capable of advancement therealong, feed mechanism carried by the bar for advancing said head along the bar, said bar, feed mechanism and cutter head adapted to be inserted as a unit through the open side of the housing into the bore of the cylinder when the housing is secured to the cylinder, driving means journaled to be supported by the housing to engage said boring bar for rotation, and means disposed interior said housing to engage the cutter head and feed mechanism to advance the same as the bar is rotated.

3. In a reboring tool, a supporting member adapted to be detachably secured to one end of a cylinder, a second supporting member in the form of an open side housing adapted to be detachably secured to the opposite end of the cylinder, a center carried by each supporting member, one of said centers being axially adjustable relative its supporting member, a boring bar rotatably supported between said centers, a cutter head carried by said bar and adapted to be advanced therealong, feed mechanism carried by the bar adapted to advance said cutter head as the bar is rotated, said boring bar, feed mechanism and cutter head adapted to be inserted through an opening in the housing into the bore of the cylinder to be positioned between said centers when the housing is attached to the cylinder, and driving means for said boring bar journaled in one supporting member, adapted to engage the boring bar for rotation.

4. In a reboring tool, a supporting member having a center adapted to be releasably secured to a cylinder so that the center is disposed axially the bore of the cylinder, an open side housing adapted to be releasably secured to the opposite end of the cylinder, an axially adjustable center carried by said housing, a boring bar revolvably supported between said centers and carrying a cutter head adapted for advancement therealong and feed mechanism to advance said cutter head, which boring bar, cutter head and feed mechanism are adapted to be inserted as a unit through the open side of the housing into the bore of the cylinder when the housing is attached to the cylinder, a supporting bracket detachably secured to the housing extending across the open side thereof, and a rotatable driving member journaled in said bracket adapted to engage said boring bar for rotation.

5. In a reboring tool, a supporting member having a center adapted to be releasably secured to a cylinder so that the center is disposed axially the bore of the cylinder, a housing open at one side and adapted to be releasably secured to the opposite end of the cylinder, an axially adjustable center carried by said housing, a boring bar revolvably supported between said centers and carrying a cutter head adapted for advancement therealong and feed mechanism to advance said cutter head, which boring bar, cutter head and feed mechanism are adapted to be inserted as a unit through the open side of the housing into the bore of the cylinder when the housing is attached to the cylinder, a supporting bracket detachably secured to the housing extending across the open side thereof, and a rotatable driving member journaled in said bracket adapted to engage said boring bar for rotation, and means supported by the center carried by the housing to engage said feed mechanism to advance the cutter head as the boring bar is rotated.

In testimony whereof, I sign this specification.

RAYMOND W. GAGE.